(12) United States Patent
Odate

(10) Patent No.: US 8,474,872 B2
(45) Date of Patent: Jul. 2, 2013

(54) PASSIVE SAFETY DEVICE

(75) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 234 days.

(21) Appl. No.: 12/967,203

(22) Filed: Dec. 14, 2010

(65) Prior Publication Data

US 2011/0140404 A1 Jun. 16, 2011

(30) Foreign Application Priority Data

Dec. 15, 2009 (JP) ................. 2009-283766

(51) Int. Cl.
*B60R 21/18* (2006.01)

(52) U.S. Cl.
USPC ............ 280/806; 297/471; 280/748; 280/753

(58) Field of Classification Search
USPC ............... 280/730.1, 730.2, 748, 753, 801.1, 280/802, 806; 297/469–472; 296/68.1; 701/45
See application file for complete search history.

(56) References Cited

U.S. PATENT DOCUMENTS

| | | | | |
|---|---|---|---|---|
| 4,592,588 A * | 6/1986 | Isono et al. | ................ | 297/284.6 |
| 4,636,000 A * | 1/1987 | Nishino | ................ | 297/284.9 |
| 4,655,505 A * | 4/1987 | Kashiwamura et al. | ... | 297/284.6 |
| 4,722,550 A * | 2/1988 | Imaoka et al. | ................ | 280/727 |
| 5,129,704 A * | 7/1992 | Kishi et al. | ................ | 297/284.1 |
| 5,130,622 A * | 7/1992 | Takizawa et al. | ............. | 318/265 |
| 5,290,084 A * | 3/1994 | Sinnhuber | .................... | 296/68.1 |
| 6,029,993 A * | 2/2000 | Mueller | ................ | 280/730.2 |
| 6,241,280 B1 * | 6/2001 | Biewendt et al. | ............. | 280/735 |
| 6,873,892 B2 * | 3/2005 | Katz et al. | ....................... | 701/49 |
| 6,896,325 B2 * | 5/2005 | Takedomi et al. | ......... | 297/216.1 |
| 7,068,178 B2 * | 6/2006 | Oh | .................... | 340/667 |
| 7,478,828 B2 * | 1/2009 | Heuschmid et al. | ....... | 280/730.1 |
| 7,708,343 B2 * | 5/2010 | Kayumi et al. | ............ | 297/284.9 |
| 7,735,895 B2 * | 6/2010 | Brown et al. | .............. | 296/65.01 |
| 7,775,552 B2 * | 8/2010 | Breuninger et al. | ....... | 280/730.2 |
| 7,917,264 B2 * | 3/2011 | Hozumi et al. | ................. | 701/49 |
| 8,160,771 B2 * | 4/2012 | Okada et al. | ................. | 701/32.2 |
| 2002/0175507 A1 * | 11/2002 | Kobayashi et al. | ........... | 280/735 |
| 2003/0023363 A1 | 1/2003 | Katz et al. | | |
| 2005/0189752 A1 * | 9/2005 | Itoga et al. | .................... | 280/741 |
| 2008/0319617 A1 | 12/2008 | Takemura | | |
| 2010/0283229 A1 * | 11/2010 | Feller et al. | ................ | 280/728.2 |

FOREIGN PATENT DOCUMENTS

| | | |
|---|---|---|
| JP | 2007-261327 | 10/2007 |
| JP | 2007-276514 | 10/2007 |
| JP | 2008-207765 | 9/2008 |
| JP | 2009-006913 | 1/2009 |
| JP | 2009-045958 | 3/2009 |
| JP | 2009-166773 | 7/2009 |

* cited by examiner

*Primary Examiner* — Joseph Rocca
*Assistant Examiner* — James English
(74) *Attorney, Agent, or Firm* — Rankin, Hill & Clark LLP

(57) ABSTRACT

There is provided a passive safety device which can prevent an occupant from moving when an acceleration that causes the occupant to move in a vehicle is working on the occupant, and which can improve the ride comfort. A passive safety device of the present invention comprises an acceleration detecting unit that detects an acceleration of a vehicle, a seat adjusting unit that expands a seat side of a seat in order to prevent an occupant sitting down the seat from moving, a safety belt adjusting unit that controls tension of a safety belt worn by the occupant, and a control unit that controls an expansion of the seat side and/or the tension of the safety belt through the seat adjusting unit and the safety belt adjusting unit, based on the detected acceleration of the vehicle.

11 Claims, 12 Drawing Sheets

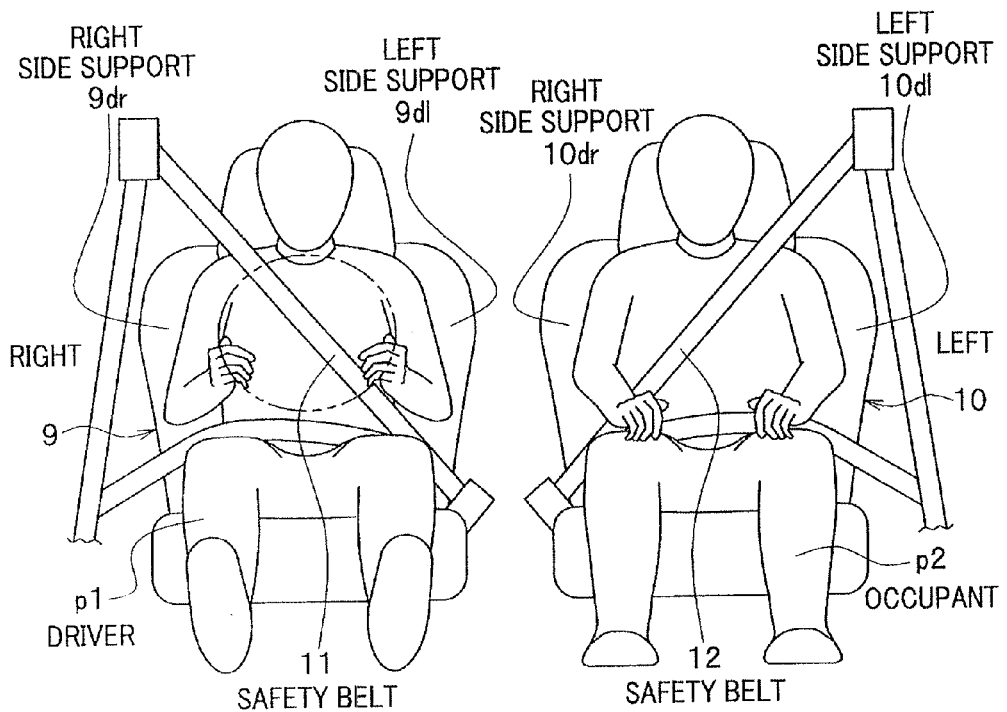
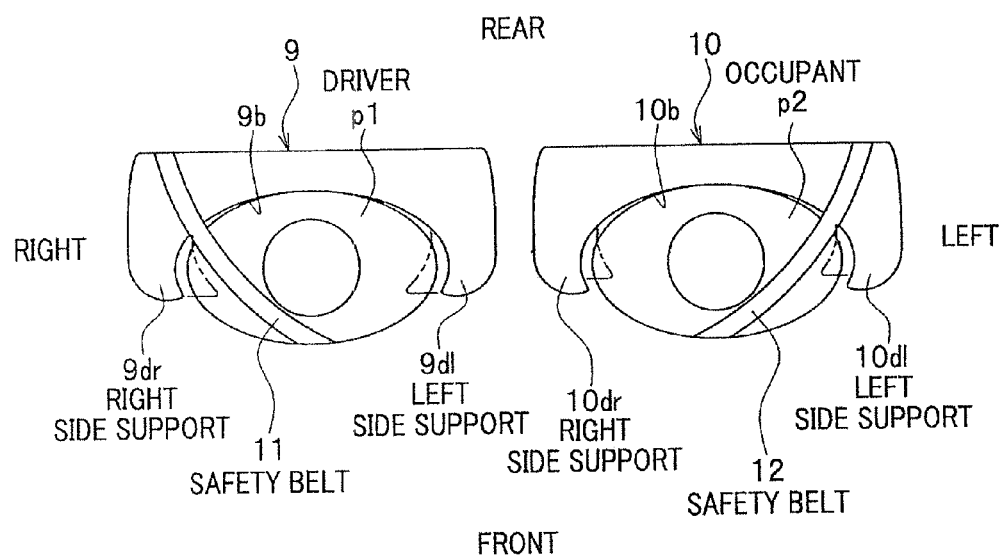

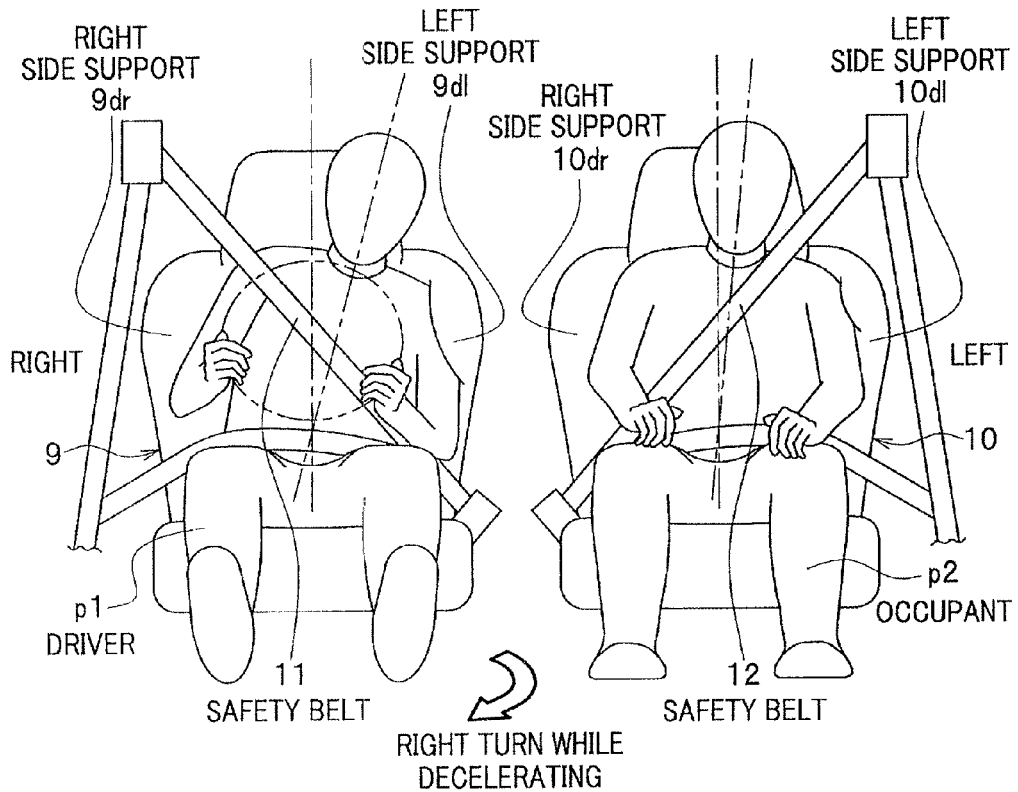
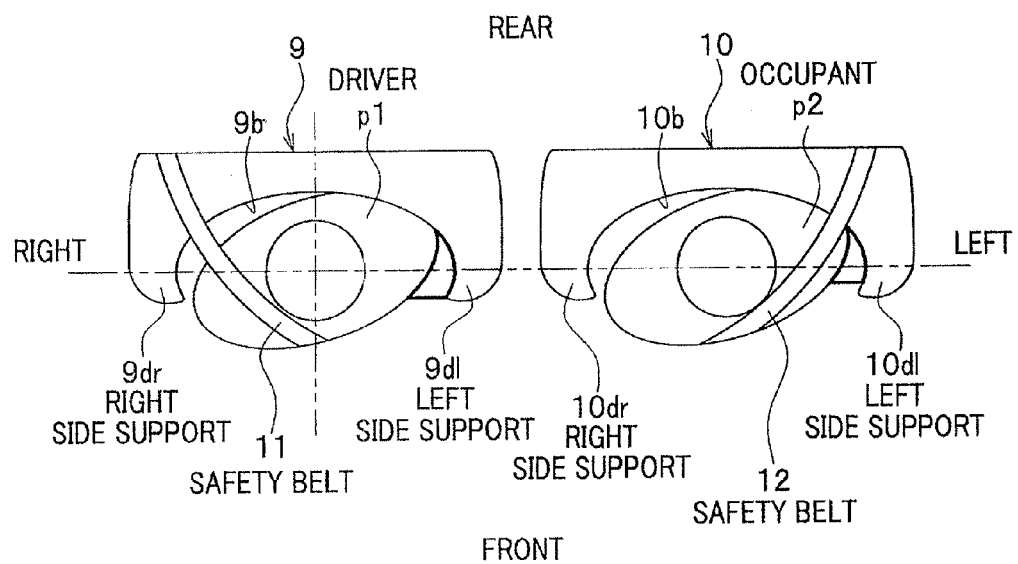

PASSIVE SAFETY DEVICE

BACKGROUND OF THE INVENTION

1. Field of the Invention

The present invention relates to a vehicle, and more specifically, a passive safety device that prevents an occupant from moving against an acceleration working on the occupant in the vehicle while the vehicle is traveling.

2. Description of the Related Art

Conventionally, when a vehicle is traveling, if sudden braking, turning together with deceleration, and acceleration, etc., happens, an acceleration is applied in some cases to an occupant in the vehicle in such a way that the occupant is moved in the vehicle due to inertia force.

In order to overcome such a problem, so far, a pretensioner is proposed which reduces the amount of movement of the occupant by increasing/decreasing the tension of a safety belt worn by the occupant sitting down a seat.

Also, a seat control to move the seat, where the occupant is sitting, back and forth and to change the tilting angle of the backrest of the seat back and forth is known.

Regarding the pretensioner and a seat control, Japan Patent No. 4285569 (see, for example, [0030], [0058], FIG. 1, and FIG. 7) discloses a "passive safety device comprising seat adjusting means for adjusting a condition of a seat in an appropriate condition, belt adjusting means for adjusting the tension of a safety belt, determining means for determining whether or not it is necessary to adjust the condition of the seat and the tension of the safety belt, and control means for controlling the seat adjusting means and the belt adjusting means when the determining means determines that it is necessary to adjust the condition of the seat and the tension of the safety belt, in such a manner that the belt adjusting means starts adjustment after the seat adjusting means terminates adjustment, or that the belt adjusting means starts adjustment after the seat adjusting means starts adjustment and the seat adjusting means terminates adjustment when a predetermined tension is about to be applied to the safety belt by adjustment of the belt adjusting means", which is recited in claim 1.

According to the configuration of Japan Patent No. 4285569, either one of the safety belt or the seat is controlled, so that the control cannot keep up with an acceleration working on the vehicle and the occupant is not held appropriately in some cases, resulting in an uncomfortable feeling to the occupant.

The present invention has been made in order to overcome the foregoing problem, and it is an object of the present invention to provide a passive safety device which can prevent an occupant from moving when an acceleration that causes the occupant to move in a vehicle is applied to the occupant, and which can improve the ride quality.

SUMMARY OF THE INVENTION

In order to achieve the above object, a first aspect of the present invention provides a passive safety device that comprises: an acceleration detecting unit that detects an acceleration of a vehicle; a seat adjusting unit that expands a seat side of a seat in order to prevent an occupant sitting down the seat from moving; a safety belt adjusting unit that controls tension of a safety belt worn by the occupant; and a control unit that controls an expansion of the seat side and/or the tension of the safety belt through the seat adjusting unit and the safety belt adjusting unit based on to the detected acceleration of the vehicle.

According to the first aspect of the present invention, the occupant can be appropriately held by the expansion of the seat side and/or the tension of the safety belt based on the detected acceleration of the vehicle, thereby effectively suppressing the movement of the occupant in the vehicle.

A second aspect of the present invention provides the passive safety device of the first aspect of the present invention, in which the control unit controls either one of or both of the seat adjusting unit and the safety belt adjusting unit in accordance with a direction of an acceleration working on the occupant due to inertia to move the occupant in the vehicle by the detected acceleration of the vehicle.

According to the second aspect of the present invention, it is determined whether either one of or both of the seat adjusting unit and the safety belt adjusting unit are used depending on the direction of the acceleration working on the occupant to move the occupant in the vehicle. Therefore, the most appropriate unit for suppressing the movement of the occupant can be selected based on the direction of the acceleration working on the occupant.

A third aspect of the present invention provides the passive safety device of the second aspect of the present invention, in which the control unit determines whether or not to use each of the seat adjusting unit and the safety belt adjusting unit in accordance with a value of the acceleration working on the occupant due to inertia to move the occupant in the vehicle by the detected acceleration of the vehicle.

According to the third aspect of the present invention, it is determined whether or not to use each of the seat adjusting unit and the safety belt adjusting unit based on the value of the acceleration working on the occupant. Accordingly, cases can be divided into a case in which holding by the seat adjusting unit and/or the safety belt adjusting unit is required and a case in which such holding is unnecessary.

A fourth aspect of the present invention provides the passive safety device of anyone of the first to third aspects of the present invention, in which when the direction of the acceleration working on the occupant due to inertia to move the occupant in the vehicle by the detected acceleration of the vehicle is a rearward direction of the vehicle, the seat adjusting unit is actuated to expand the seat side.

According to the fourth aspect of the present invention, when the direction of the acceleration working on the occupant is a rearward direction of the vehicle, the seat adjusting unit is actuated to expand the seat side, thereby appropriately holding the occupant and preventing the occupant from moving.

A fifth aspect of the present invention provides the passive safety device of any one of the first to third aspects of the present invention, in which when the direction of the acceleration working on the occupant due to inertia to move the occupant in the vehicle by the detected acceleration of the vehicle is a front-side direction of the vehicle, the seat adjusting unit expands the seat side and the safety belt adjusting unit applies tension to the safety belt.

According to the fifth aspect of the present invention, when the direction of the acceleration working on the occupant is a front-side direction of the vehicle, the seat adjusting unit expands the seat side, and the safety belt adjusting unit gives tension to the safety belt, thereby appropriately holding the occupant and preventing the occupant from moving.

A sixth aspect of the present invention provides the passive safety device of the fifth aspect of the present invention, in which when the direction of the acceleration working on the occupant due to inertia to move the occupant in the vehicle by the detected acceleration of the vehicle is a front-side direction opposite to a shoulder where the safety belt is put on, the seat adjusting unit largely expands the seat side larger in comparison with directions other than the front-side direction.

According to the sixth aspect of the present invention, when the direction of the acceleration working on the occupant is a front-side direction opposite to a shoulder where the safety belt is put on, expansion of the seat side by the seat adjusting unit is increased in comparison with other directions other than the front-side direction, so that the acceleration in the front-side direction opposite to the shoulder of the occupant where the safety belt is put on can be effectively reduced, thereby preventing the occupant from moving.

A seventh aspect of the present invention provides the passive safety device of any one of the first to sixth aspects of the present invention, in which the control unit starts either one of or both of controlling of expansion of the seat side by the seat adjusting unit and controlling of tension of the safety belt by the safety belt adjusting unit when the acceleration working on the occupant due to inertia to move the occupant in the vehicle by the detected acceleration of the vehicle is not less than a predetermined value.

According to the seventh aspect of the present invention, either one of or both of the expansion control of the seat side by the seat adjusting unit and the tension control of the safety belt by the safety belt adjusting unit are started when the acceleration working on the occupant to move the occupant in the vehicle is not less than the predetermined value, so that the control can be executed appropriately without increasing the process load.

An eighth aspect of the present invention provides the passive safety device of any one of the first to seventh aspects of the present invention, in which when the acceleration working on the occupant due to inertia to move the occupant in the vehicle by the acceleration detected by the acceleration detecting unit becomes not more than a predetermined value, the control unit terminates the control of the seat adjusting unit and/or the safety belt adjusting unit in operation.

According to the eighth aspect of the present invention, when the acceleration working on the occupant becomes not more than the predetermined value, the control unit terminates the control of the sear adjusting unit and/or the safety belt adjusting unit in operation, so that the control of the seat adjusting unit and/or the safety belt adjusting unit in operation can be appropriately terminated.

A ninth aspect of the present invention provides the passive safety device of the eighth aspect of the present invention, in which when the direction of the acceleration working on the occupant due to inertia to move the occupant in the vehicle by the detected acceleration of the vehicle is a front-side direction opposite to a shoulder where the safety belt is put on, the control unit terminates the control of the seat adjusting unit, and then terminates the control of the safety belt adjusting unit.

According to the ninth aspect of the present invention, when the direction of the acceleration working on the occupant is a front-side direction opposite to a shoulder where the safety belt is put on, the control unit first terminates the control of the seat adjusting unit, and then terminates the control of the safety belt adjusting unit, so that the sequencing for termination of the control of the seat adjusting unit and for termination of the control of the safety belt adjusting unit becomes appropriate.

According to the present invention, when an amount of displacement of the occupant is forecasted, the seat and the safety belt are appropriately controlled, thereby reducing the amount of displacement of the occupant.

BRIEF DESCRIPTION OF THE DRAWINGS

FIG. 3A is a front view showing a driver sitting down a driver's seat and an occupant sitting down a passenger seat as viewed from the front, each seat being a front seat of a vehicle equipped with a passive safety device of the embodiment;

FIG. 3B is a top view showing the driver sitting down the driver's seat and the occupant sitting down the passenger seat as viewed from the above, the each seat being the front seat of the vehicle equipped with the passive safety device of the embodiment;

FIG. 6A is a front view showing respective conditions of a driver sitting down the driver's seat and an occupant sitting down the passenger seat when a vehicle turns right while decelerating;

FIG. 6B is a top view showing respective conditions of the driver sitting down the driver's seat and the occupant sitting down the passenger seat when the vehicle turns right while decelerating;

DETAILED DESCRIPTION OF THE PREFERRED EMBODIMENT

An explanation will be given of an embodiment of the present invention with reference to the accompanying drawings.

Figure 1:
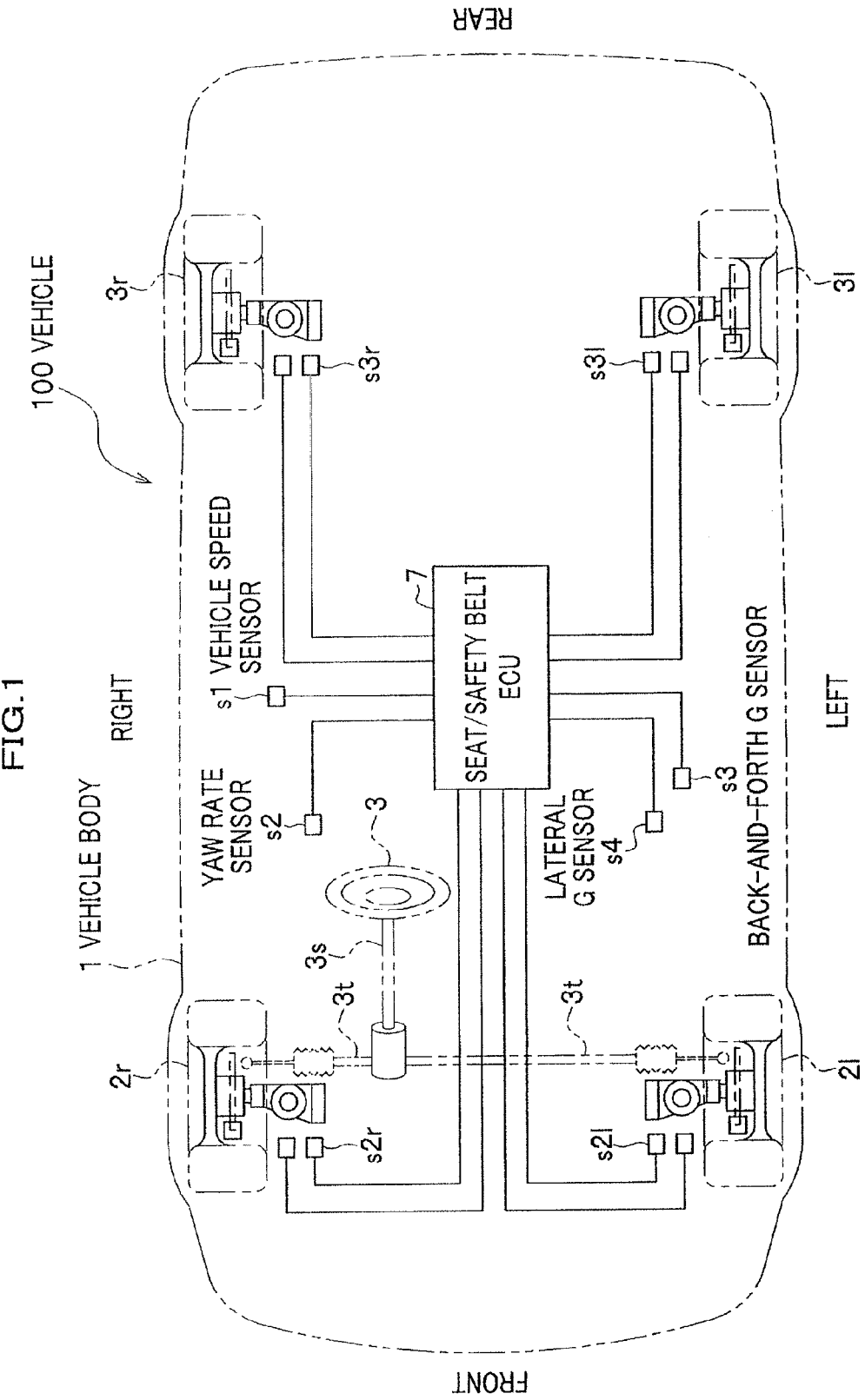
FIG. 1 is a conceptual top view showing a general configuration of a major part of a vehicle equipped with a passive safety device according to an embodiment of the present invention.

FIG. 1 is a conceptual top view showing a general configuration of a major part of a vehicle 100 equipped with a passive safety device according to an embodiment of the present invention.

The vehicle 100 of the embodiment includes a right front wheel 2r and a left front wheel 2l which are steering wheels at the front both sides of a vehicle body 1, and a right rear wheel 3r and a left rear wheel 3l which are driving wheels at the rear both sides of the vehicle body 1. Each of the right front wheel 2r, left front wheel 2l, right rear wheel 3r, and left rear wheel 3l is equipped with a brake (not shown) for braking.

The right front wheel 2r and the left front wheel 2l are connected to a steering wheel 3 through a steering shaft 3s, tie rods 3t, etc.

The vehicle 100 includes, as sensors for detecting its traveling condition, a vehicle speed sensor s1 for detecting a vehicle speed, a yaw rate sensor s2 for detecting a yaw rate of the vehicle body 1, a back-and-forth G sensor s3 for detecting an acceleration in the back-and-forth direction (the vertical direction of FIG. 1) of the vehicle body 1, a lateral G sensor s4 for detecting an acceleration in the lateral direction (the right-and-left direction in FIG. 1) of the vehicle body 1, and wheel speed sensors s2r, s2l, s3r, and s3l for detecting respective wheel speeds of the right front wheel 2r, the left front wheel 2l, the right rear wheel 3r, and the left rear wheel 3l.

Signals and the like detected by the vehicle speed sensor s1, the yaw rate sensor s2, the back-and-forth G sensor s3, the lateral G sensor s4, and the wheel speed sensors s2r, s2l, s3r, and s3l are input into an ECU (Electronic Control Unit) (not shown) that comprehensively controls the whole vehicle 100 and a seat/safety belt ECU 7 that configures the passive safety device of this embodiment.

<Safety Belts 11, 12>

Figure 2:
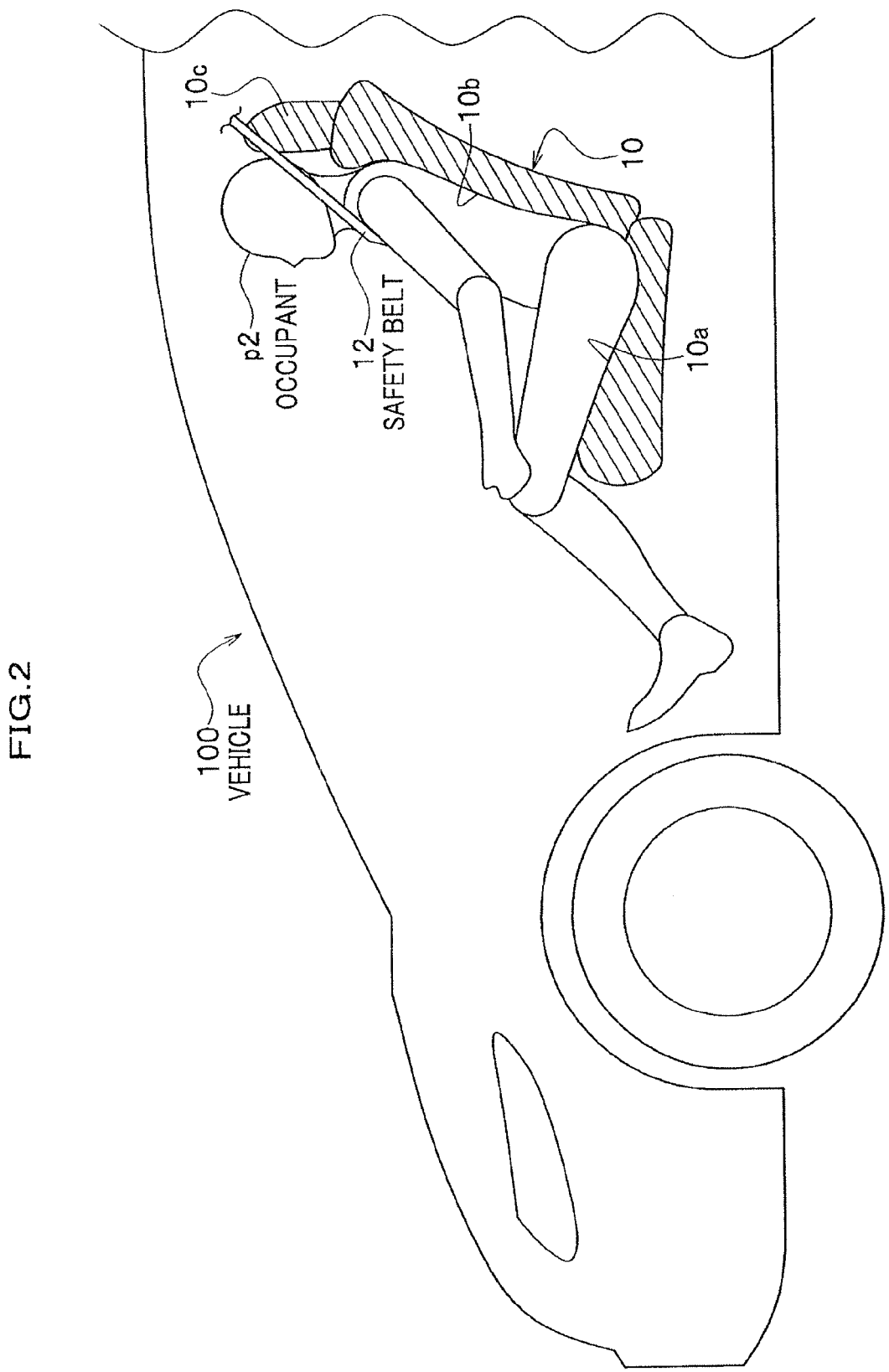
FIG. 2 is a conceptual side view showing the proximity of a front seat of a vehicle equipped with a passive safety device of the embodiment as viewed from the right.

FIG. 2 is a conceptual side view showing the proximity of a front seat of the vehicle 100 equipped with the passive safety device of the embodiment shown in FIG. 1 as viewed from the right. In FIG. 2, a left side support 10dl to be discussed later of a passenger seat 10 is omitted.

FIG. 3A is a front view showing a driver p1 sitting down a driver's seat 9 and an occupant p2 sitting down a passenger seat 10 as viewed from the front, each seat being a front seat of the vehicle 100 equipped with the passive safety device of the embodiment, and FIG. 3B is a top view showing the driver p1 sitting down the driver's seat 9 and the occupant p2 sitting down the passenger seat 10 of the vehicle 100 as viewed from the above.

The driver p1 sitting down the driver's seat 9 wears a safety belt 11 which holds the driver p1 to the driver's seat 9, and the occupant p2 sitting down the passenger seat 10 wears a safety belt 12 that holds the occupant p2 to the passenger seat 10 while the vehicle 100 is traveling.

The safety belt 11 worn by the driver p1 is provided with a pretensioner (safety belt adjusting means) which enhances the holding effect by its tension, and the pretensioner controls the holding of the driver p1 by the tension of the safety belt 11 by using, for example, a driving force of a motor (not shown), and a driving force by a movement of a ball (not shown) by gas pressure.

Likewise, a safety belt 12 worn by the occupant p2 is provided with a pretensioner (safety belt adjusting means) that enhances the holding effect by its tension, and the pretensioner controls the holding of the occupant p2 by the tension of the safety belt 12 by using, for example, a driving force of a motor (not shown), and a driving force by a movement of a ball (not shown) by gas pressure.

<Driver's Seat 9 and Passenger Seat 10>

Figure 4:
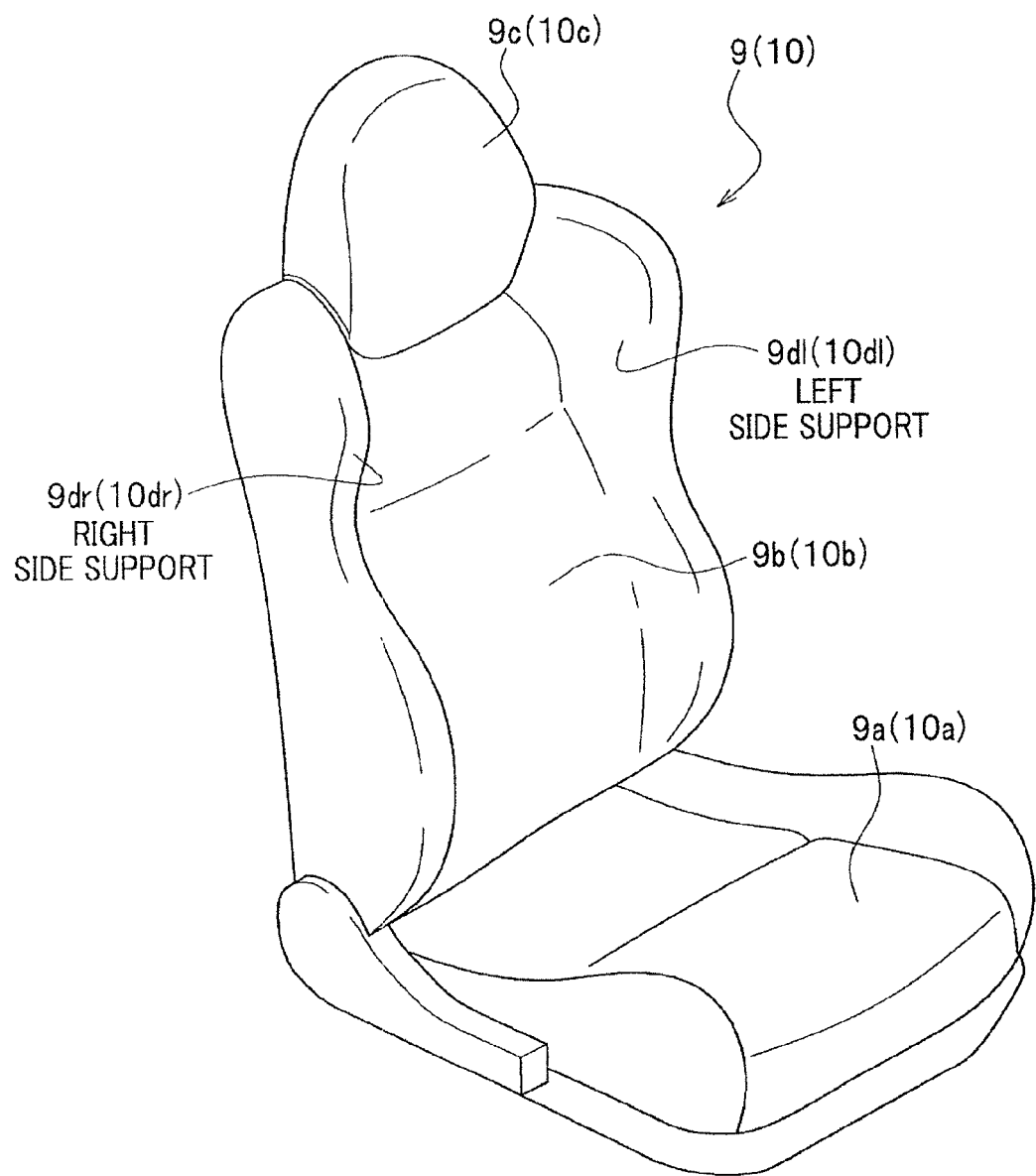
FIG. 4 is a perspective view showing the driver's seat (passenger seat) as viewed from the front-side direction.

FIG. 4 is a perspective view showing the driver's seat 9 (passenger seat 10) as viewed from the front side.

The driver's seat 9 includes a seat 9a where the hip of the driver p1 is put on, a backrest 9b for supporting the back and the shoulders of the driver p1, a headrest 9c for supporting the head of the driver p1, a right side support 9dr that prevents the driver p1 from moving in the right direction (see FIGS. 3A and 3B), and a left side support 9dl that prevents the driver p1 from moving in the left direction (see FIGS. 3A and 3B).

Likewise, the passenger seat 10 includes a seat 10a where the hip of the occupant p2 is put on, a backrest 10b for supporting the back and the shoulders of the occupant p2, a headrest 10c for supporting the head of the occupant p2, a right side support 10dr that prevents the occupant p2 from moving in the right direction (see FIGS. 3A and 3B), and a left side support 10dl that prevents the occupant p2 from moving in the left direction (see FIGS. 3A and 3B).

<Individual Seat Adjusting Means for Driver's Seat 9 and Passenger Seat 10>

Provided in respective interiors of the right and left side supports 9dr, 9dl of the driver's seat 9 are balloon-like bags (expanding members, not shown) which cause the right add left side supports 9dr, 9dl to expand (see two-dot chain lines in FIG. 3B) when air is supplied through non-illustrated air compressor, an accumulator, valves, etc., in order to hold the driver p1 to the driver's seat 9 from the right, left, front right, front left, etc., and to prevent the driver p1 from moving. The balloon-like bags of the expanding members restore the right and left side supports 9dr, 9dl to respective original shapes (see solid lines in FIG. 3B) when the supplied air is evacuated, thereby releasing the driver p1.

The structure which causes the right and left side supports 9dr, 9dl to expand for preventing the driver p1 from moving is referred to as seat adjusting means for the driver's seat 9.

Likewise, provided in respective interiors of the right and left side supports 10dr, 10dl of the passenger seat 10 are balloon-like bags (expanding members, not shown) which cause the right and left side supports 10dr, 10dl to expand (see two-dot chain lines in FIG. 3B) when air is supplied through non-illustrated air compressor, an accumulator, valves, etc., in order to hold the occupant p2 to the passenger seat 10 from the right, left, front right, front left, etc., and to prevent the occupant p2 from moving. The balloon-like bags of the expanding members restore the right and left side supports 10dr, 10dl to respective original shapes (see solid lines in FIG. 3B) when the supplied air is evacuated, thereby releasing the occupant p2.

The structure which causes the right and left side supports 10dr, 10dl to expand for preventing the occupant p2 from moving is referred to as seat adjusting means for the passenger seat 10.

Exemplified in this embodiment is a case in which air is used for the expanding members in respective interiors of the right and left side supports 9dr, 9dl of the driver's seat 9 and the expanding members in respective interiors of the right and left side supports 10dr, 10dl of the passenger seat 10, but gases other than air can be used for the expanding members.

Also, the expanding members in respective interiors of the right and left side supports 9dr, 9dl of the driver's seat 9 and the expanding members in respective interiors of the right and left side supports 10dr, 10dl of the passenger seat 10 are each a balloon-like bag utilizing taking in/out of air as exemplified above, but may be a mechanism which is actuated by a motor and a driving force thereof, so that the structure of the expanding member is not limited as far as the foregoing function can be achieved.

As the expanding member of the seat adjusting means, the exemplified balloon-like bag is preferable because it is soft and comfortable to touch.

<Function of Passive Safety Device>

Next, an explanation will be given of the working (function) of the passive safety device together with a traveling condition of the vehicle 100 on a phenomenon basis.

Figure 5:
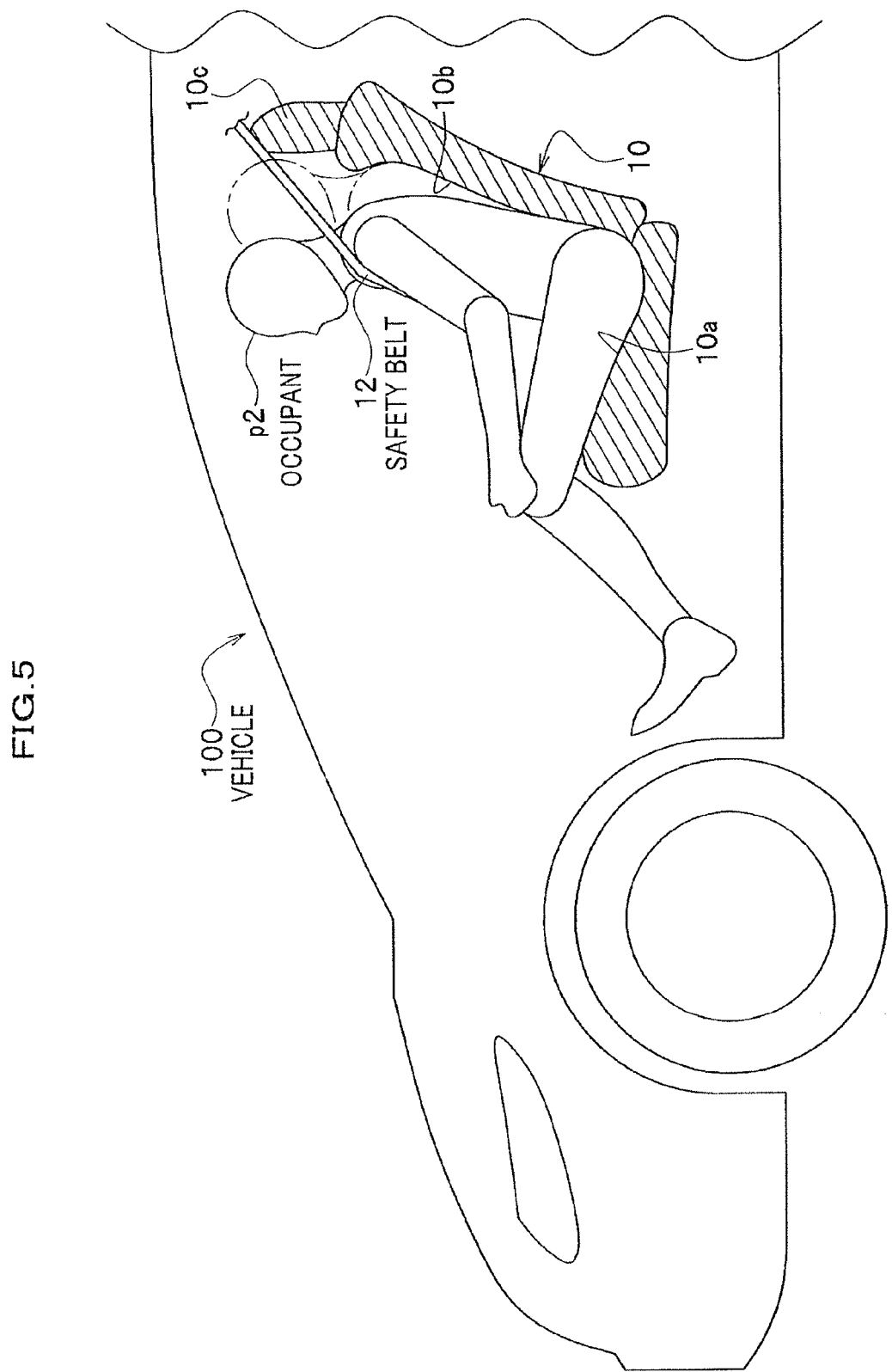
FIG. 5 is an illustration showing a condition of an occupant sitting down a passenger seat in a vehicle when sudden braking happens.

FIG. 5 is an illustration showing a condition of the occupant p2 sitting down the passenger seat 10 in the vehicle 100 when sudden braking happens.

When sudden braking is applied to the vehicle 100, a frontward acceleration works on the occupant p2 sitting down the passenger seat 10 due to inertia in the interior of the vehicle 100, and the occupant p2 is moved to the front apart from the passenger seat 10 (see the solid line in FIG. 5).

Regarding this forward movement of the occupant p2 sitting down the passenger seat 10, holding of the occupant p2 to the passenger seat 10 by the safety belt 12 using the pretensioner (safety belt adjusting means) is more effective than holding of the occupant p2 by the expanding members (seat adjusting means) of the right and left side supports 10dr, 10dl of the passenger seat 10.

FIG. 6A is a front view showing respective conditions of the driver p1 sitting down the driver's seat 9 and the occupant p2 sitting down the passenger seat 10 when the vehicle 100 turns right while decelerating. FIG. 6B is a top view showing respective conditions of the driver p1 sitting down the driver's seat 9 and the occupant p2 sitting down the passenger seat 10 when the vehicle 100 turns right while decelerating.

When the vehicle 100 turns right while decelerating, accelerations which cause the driver p1 and the occupant p2 to move to the front left against the vehicle 100 work due to inertia on the driver p1 sitting down the driver's seat 9 and the occupant p2 sitting down the passenger seat 10 because the vehicle 100 turns right while decelerating.

At this time, the right-half part of the body of the driver p1 is held by the tension of the safety belt 11, but the left-half part (in particular, the left shoulder) of the body of the driver p1 is not held by the safety belt 11, so that the left-half part of the body of the driver p1 moves frontward so as to be apart from the driver's seat 9. In this case, the expanding level of the expanding member (seat adjusting means) of the left side support 9dl of the driver's seat 9 is controlled to become large to hold the driver p1 to the driver's seat 9 (see the thick solid line in FIG. 6B). This realizes effective reduction of amount of displacement that the driver p1 moves apart from the driver's seat 9 in the front left direction.

On the other hand, at this time, because the left-half part of the body of the occupant p2 of the passenger seat 10 is held by the safety belt 12, the expanding level of the expanding member (seat adjusting means) of the left side support 10dl of the passenger seat 10 is controlled to be small (see the thick solid line in FIG. 6B), and the occupant p2 is held by the tension of the safety belt 12 by the pretensioner (safety belt adjusting means) and by the expansion of the expanding member (seat adjusting means) of the left side support 10dl, thereby preventing the movement of the occupant p2 apart from the passenger seat 10 in the front left direction.

Next, an explanation will be given of the seat/safety belt ECU 7 of the passive safety device which reduces an amount of movement of the driver p1 apart from the driver's seat 9 by the tension control of the safety belt 11 by the pretensioner and by the control of respective expanding members of the right and left side supports 9dr, 9dl, and an amount of movement of the occupant p2 apart from the passenger seat 10 by the tension control of the safety belt 12 by the pretensioner and by the control of respective expanding members of the right and left side supports 10dr, 10dl, when the vehicle 100 is traveling as explained above.

<Seat/Safety Belt ECU 7>

A control of the pretensioner of the safety belt 11 in the driver's seat 9 and a control of each of the expanding members of the right and left side supports 9dr, 9dl in the driver's seat 9, and a control of the pretensioner of the safety belt 12 in the passenger seat 10 and a control of each of the expanding members of the right and left side supports 10dr, 10dl in the passenger seat 10 will be referred to as a seat/safety belt control. The seat/safety belt control is performed by the seat/safety belt ECU 7 (see FIG. 1).

Figure 7:
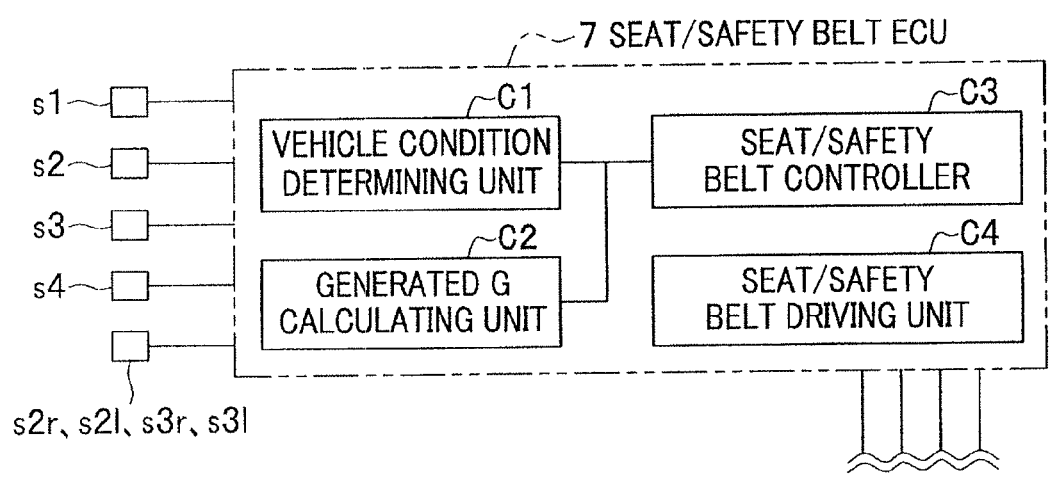
FIG. 7 is a block diagram showing a configuration of a seat/safety belt ECU.

FIG. 7 is a block diagram showing a configuration of the seat/safety belt ECU 7.

The seat/safety belt ECU 7 includes a vehicle condition determining unit C1 that determines in which condition the own vehicle 100 is traveling, a generated G calculating unit C2 that calculates, based on detection information from the back-and-forth G sensor s3, the lateral G sensor s4 and etc., in which direction an acceleration is working on the driver p1 and the occupant p2 to move the driver p1 and the occupant p2 in the interior of the vehicle 100 based on an acceleration working on the vehicle 100, a seat/safety belt controller C3 that outputs information for appropriately controlling the seat and the safety belt when it is determined that the driver p1 and the occupant p2 will be moved in the interior of the vehicle 100 due to inertia based on information from the generated G calculating unit C2, so as to prevent the driver p1 and the occupant p2 from moving depending on the direction of the acceleration working on each of the driver p1 and the occupant p2 to be moved, and a seat/safety belt driving unit C4 that actually drives and controls individual expanding members of the right and left side supports 9dr, 9dl of the driver's seat 9, the pretensioner of the safety belt 11, individual expanding members of the right and left side supports 10dr, 10dl of the passenger seat 10, and the pretensioner of the safety belt 12, based on the information from the seat/safety belt controller C3.

Each unit of the seat/safety belt ECU 7 will be explained in detail below.

<Vehicle Condition Determining Unit C1 of Seat/Safety Belt ECU 7>

The vehicle condition determining unit C1 of the seat/safety belt ECU 7 determines how much braking is applied, e.g., a wheel lock, based on, for example, wheel speed information from respective wheel speed sensors s2r, s2l, s3r, s3l of the right front wheel 2r, the left front wheel 2l, the right rear wheel 3r, and the left rear wheel 3l (see FIG. 1) of the vehicle 100 and acceleration information from the back-and-forth G sensor s3 and the lateral G sensor s4, and detects, for example, a wheel spin that is spin out of control of a drive wheel from detection information of the vehicle speed sensor s1 and the wheel speed sensors s3r, s3l, thereby determining the condition of the vehicle 100.

Also, the vehicle condition determining unit C1 detects a turning condition of the vehicle 100 based on detection information from, for example, the yaw rate sensor s2 in order to detect an over steering and an under steering, thereby determining the condition of the vehicle 100. The vehicle condition determining unit C1 may detect at least one of these conditions or may detect a condition other than these of the vehicle 100.

<Generated G Calculating Unit C2 of Seat/Safety Belt ECU 7>

Next, an explanation will be given of a function of the generated G calculating unit C2 (see FIG. 7) of the seat/safety belt ECU 7.

Figure 8A:
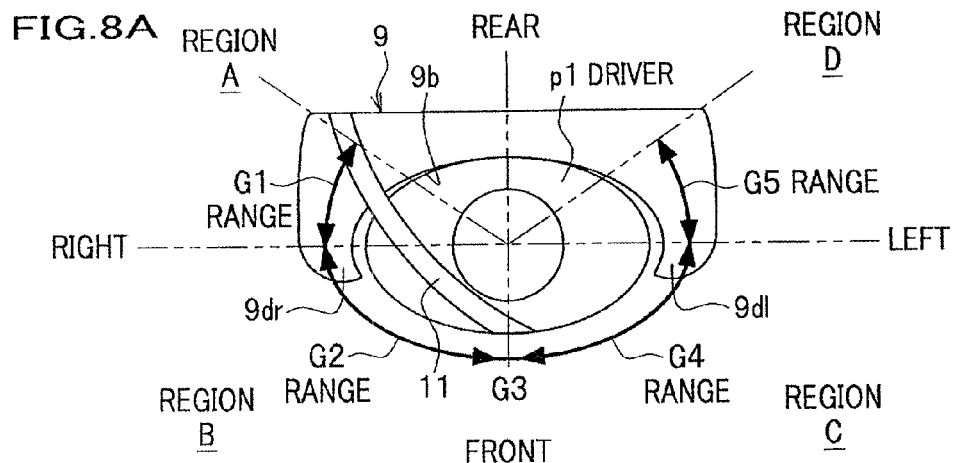
FIG. 8A is a top view showing a driver sitting down the driver's seat as viewed from the above.
Figure 8B:
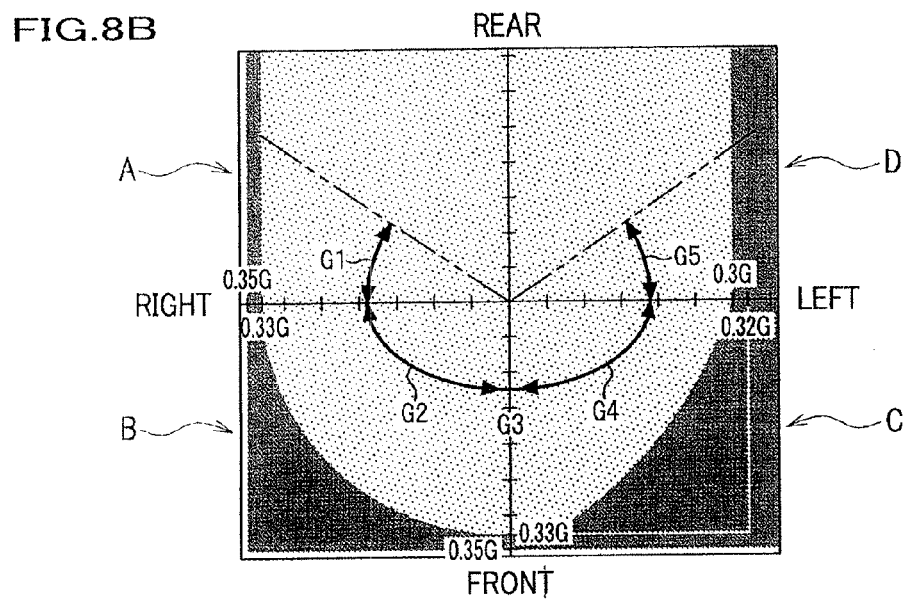
FIG. 8B is a diagram showing a region of an acceleration (back-and-forth G: acceleration indicated by the vertical axis and right-and-left G: acceleration indicated by the horizontal axis) working on the driver, which causes the driver in FIG. 8A to move apart from the driver's seat, due to an acceleration working on the vehicle, a region where seat/safety belt control is performed and a region where no control is performed with respect to the region of the acceleration working on the driver.
Figure 8C:
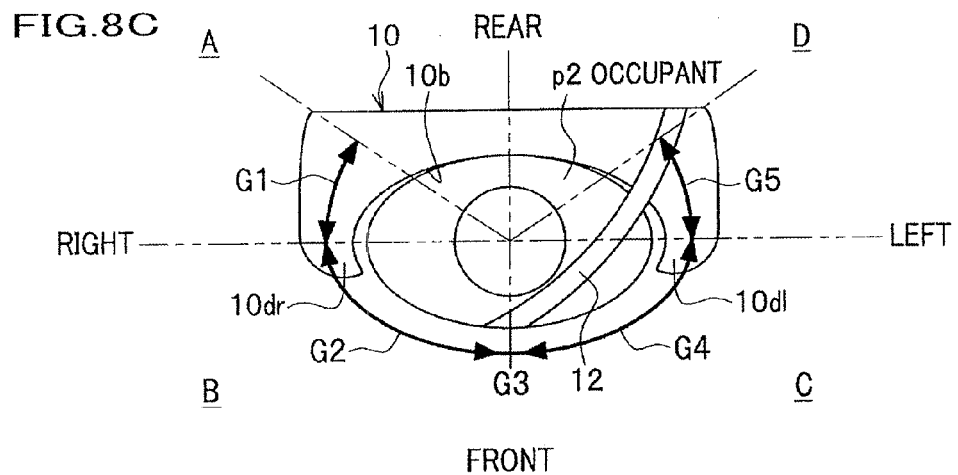
FIG. 8C is a top view showing an occupant sitting down the passenger seat as viewed from the above.

FIG. 8A is a top view showing the driver p1 sitting down the driver's seat 9 as viewed from the above. FIG. 8B is a diagram showing a region of an acceleration (back-and-forth G: acceleration indicated by the vertical axis and right-and-left G: acceleration indicated by the horizontal axis) working on the driver p1, which causes the driver p1 in FIG. 8A to move apart from the driver's seat 9, due to an acceleration working on the vehicle 100, a region where seat/safety belt control is performed, and a region where no control is performed among the regions of the acceleration working on the driver p1. FIG. 8C is a top view showing the occupant p2 sitting down the passenger seat 10 as viewed from the above.

In FIG. 8B, a region A is a region where a backward acceleration and a rightward acceleration are working on the driver p1 to move the driver p1, a region D is a region where a backward acceleration and a leftward acceleration are working on the driver p1 to move the driver p1, a region B is a region where a frontward acceleration and a rightward acceleration are working on the driver p1 to move the drive p1, and a region C is a region where a frontward acceleration and a leftward acceleration are working on the driver p1 to move the driver p1. In FIG. 8B, a region where seat/safety belt control is performed is indicated by deep dots, and a region where no seat/safety belt control is performed is indicated by light dots.

The reason why FIG. 8B is anti-symmetrical is that the safety belt 11 is applied on the right shoulder of the driver p1, but no safety belt is applied on the left shoulder.

The generated G calculating unit C2 calculates a direction of an acceleration working on the driver p1 due to inertia to move the driver p1 relative to the vehicle body 1 based on acceleration information (back-and-forth direction acceleration information) detected by the back-and-forth G sensor s3 and acceleration information (lateral direction acceleration information) detected by the lateral G sensor s4.

More specifically, when the direction of the acceleration of the vehicle body 1 detected by the back-and-forth G sensor s3 is the frontward direction (see FIG. 1), the direction of an acceleration which causes the driver p1 to move from the driver's seat 9 due to inertia is a rearward direction, so that the generated G calculating unit C2 determines that the range of the acceleration is the region A or the region D shown in FIGS. 8A and 8B. When the direction of the acceleration of the vehicle body 1 detected by the back-and-forth G sensor s3 is a rearward direction (see FIG. 1), the direction of an acceleration which causes the driver p1 to move from the driver's seat 9 due to inertia is a frontward direction, so that the generated G calculating unit C2 determines that the range of the acceleration is the region B or the region C shown in FIGS. 8A and 8B.

When the direction of the acceleration of the vehicle body 1 detected by the lateral G sensor s4 is a leftward direction (see FIG. 1), the direction of the acceleration which causes the driver p1 to move from driver's seat 9 due to inertia is a rightward direction, so that the generated G calculating unit C2 determines that the range of the acceleration is the region A or the region B shown in FIGS. 8A and 8B. When the direction of the acceleration of the vehicle body 1 detected by the lateral G sensor s4 is a rightward direction, the direction of the acceleration which causes the driver p1 to move from the driver's seat 9 due to inertia is a leftward direction (see FIG. 1), so that the generated G calculating unit C2 determines that the range of the acceleration is the region C or the region D shown in FIGS. 8A and 8B.

Through those operations, it is determined to which region (That is, region A, region B, region C, or region D) the direction of the acceleration that causes the driver p1 to move from the driver's seat 9 corresponds.

For example, the generated G calculating unit C2 first detects that an acceleration working on the driver p1 due to inertia to move the driver p1 in the interior of the vehicle 100 is a rearward acceleration (the acceleration of the vehicle body 1 is a frontward acceleration) through the back-and-forth G sensor s3 (see FIG. 1), and determines that the range of the acceleration is the region A or the region D in FIG. 8B. Then, when the lateral G sensor s4 detects a rightward acceleration working on the driver p1 due to inertia to move the driver p1 (the acceleration of the vehicle body 1 is a leftward acceleration), the generated G calculating unit C2 determines that the range of the acceleration is the region A, and when a leftward acceleration is detected (the acceleration of the vehicle body 1 is a rightward acceleration), the generated G calculating unit C2 determines that the range of the acceleration is the region D.

Also, when detecting that an acceleration working on the driver p1 due to inertia to move the driver p1 in the interior of the vehicle 100 is a frontward acceleration (the acceleration of the vehicle body 1 is a rearward acceleration) through the back-and-forth G sensor s3 (see FIG. 1), the generated G calculating unit C2 determines that the range of the acceleration is the region B or the region C shown in FIG. 8B. Then, when the lateral G sensor s4 detects that the direction of the acceleration working on the driver p1 to move the driver p1 in the interior of the vehicle 100 is a rightward direction (the acceleration of the vehicle body 1 is a leftward acceleration), the generated G calculating unit C2 determines that the range of the acceleration is the region B, and when a Leftward acceleration is detected (the acceleration of the vehicle body 1 is a rightward acceleration), the generated G calculating unit C2 determines that the range of the acceleration is the region C.

<Seat/Safety Belt Controller C3 of Seat/Safety Belt ECU 7>

Next, an explanation will be given of the seat/safety belt controller C3 (see FIG. 7) of the seat/safety belt ECU 7.

Based on the information from the generated G calculating unit C2, when the seat/safety belt controller C3 determines that respective amounts of displacement of the driver p1 and the occupant p2 will be generated by the acceleration due to inertia, the seat/safety belt controller C3 appropriately controls the driver's seat 9, the passenger seat 10, and the safety belts 11, 12 depending on the direction of the generated acceleration.

When the acceleration working on the driver p1 due to inertia is in the regions A and D (a rearward acceleration) shown in FIGS. 8A and 8B, the driver p1 is held his/her back by the backrest 9b of the driver's seat 9, so that the necessity for the seat/safety belt control is relatively low.

On the other hand, when the acceleration working on the driver p1 is in the region B shown in FIGS. 8A and 8B, the driver p1 is held his/her right shoulder and right chest by the safety belt 11, so that the necessity for the seat/safety belt control is not so high.

In contrast, when the acceleration working on the driver p1 is in the region C shown in FIG. 8A, the driver p1 is not held his/her left shoulder and left chest by the safety belt 11, so that the necessity for the seat/safety belt control becomes high.

When an acceleration working on the driver p1 due to inertia to move the driver p1 in the interior of the vehicle 100 is in the regions A and D shown in FIGS. 8A and 8B, if the largeness of the acceleration which is detected by the lateral G sensor s4 (see FIG. 1) and works on the driver p1 in the lateral direction is equal to or larger than a predetermined value, e.g., as shown in FIG. 8B, when a rightward acceleration working on the driver p1 is equal to or larger than 0.35 G or a leftward acceleration is equal to or larger than 0.3 G, the seat/safety belt controller C3 determines that driver p1 will be moved, and performs seat/safety belt control. On the other hand, when the largeness of the acceleration which is detected by the lateral G sensor s4 (see FIG. 1) and works on the driver p1 in the lateral direction is less than the predetermined value, e.g., as shown in FIG. 8B, when a rightward acceleration working on the driver p1 is less than 0.35 G and a leftward acceleration is less than 0.3 G, the seat/safety belt controller C3 determines that the driver p1 will not be moved, and no seat/safety belt control is performed.

In the case of the region B shown in FIGS. 8A and 8B, when a vector Length composed of a frontward acceleration and a rightward acceleration as vector components is equal to or longer than a predetermined value, e.g., as shown in FIG. 8B, when the vector length composed of the frontward acceleration and the rightward acceleration as the vector components is equal to or larger than 0.33 G, the seat/safety belt controller C3 determines that the driver p1 will be moved, and performs seat/safety belt control. On the other hand, for example, as shown in FIG. 8B, when the vector length is less than 0.33 G, the seat/safety belt controller C3 determines that the driver p1 will not be moved, and no seat/safety belt control is performed.

In the case of the region C shown in FIGS. 8A and 8B, when a frontward acceleration and a leftward acceleration are each equal to or larger than a predetermined value, e.g., as shown in FIG. 8B, when a frontward acceleration working on the driver p1 to move the driver p1 in the interior of the vehicle 100 is equal to or larger than 0.33 G, or when a leftward acceleration is equal to or larger than 0.32 G, the seat/safety belt controller C3 unconditionally determines that the driver p1 will be moved without using a table to be discussed later, and performs seat/safety belt control.

On the other hand, in the case of the region C, when the frontward acceleration and the leftward acceleration working on the driver p1 to move the driver p1 in the interior of the vehicle 100 are each less than the predetermined value, e.g., as shown in FIG. 8B, when the frontward acceleration working on the driver p1 is less than 0.33 G, or when the leftward acceleration is less than 0.32 G, the seat/safety belt controller C3 determines whether or not to perform seat/safety belt control by using a table set beforehand in reference to a region formed by the frontward acceleration and the leftward acceleration.

That is, when the largeness of the frontward acceleration and the largeness of the leftward acceleration both working on the driver p1 are larger than a predetermined range stored in the preset table (the region indicated by deep dots at the region C in FIG. 8B), the seat/safety belt controller C3 determines that the driver p1 will be moved, and performs the seat/safety belt control. On the other hand, when such largeness is within the predetermined range stored in the preset table (the region indicated by thin dots at the region C in FIG. 8B), the seat/safety belt controller C3 determines that the driver p1 will not be moved, and no seat/safety belt control is performed.

As described above, when the seat/safety belt controller C3 determines to perform the seat/safety belt control, the seat/safety belt controller C3 has at least one of the following schemes as a method for controlling the pretensioner of the safety belt 11 of the driver's seat 9, respective expanding members of the right and left side supports 9dr, 9dl of the driver's seat 9, the pretensioner of the safety belt 12 of the passenger seat 10 and respective expanding members of the right and left side supports 10dr, 10dl of the passenger seat 10 depending on a direction of the acceleration.

First, respective retracting amounts of the safety belt 11 of the driver's seat 9 and the safety belt 12 of the passenger seat 10 are set to be different from each other. For example, the safety belt 11 is retracted 10 mm and the safety belt 12 is held, or the safety belt 11 is held and the safety belt 12 is retracted 10 mm. The retracting length is not limited to 10 mm.

Also, other safety belt control schemes such that respective retracting amounts of the safety belts 11, 12 are set to be same with each other and the safety belts 11, 12 are simultaneously held may be applied.

Second, there are a case in which each of the expanding members of the right and left side supports 9dr, 9dl of the driver's seat 9 is expanded, and a case in which each of the expanding members is not expanded. Also, the expanding level of individual expanding member may differ. Likewise, there are a case in which each of the expanding members of the right and left side supports 10dr, 10dl of the passenger seat 10 is expanded, and a case in which each of the expanding members is not expanded. Also, the expanding level of individual expanding member may differ.

The seat/safety belt controller C3 combines those two schemes, thereby performing seat/safety belt control.

<Seat/Safety Belt Driving Unit C4 of Seat/Safety Belt ECU 7>

Next, an explanation will be given of a function of the seat/safety belt driving unit C4 (see FIG. 7) of the seat/safety belt ECU 7.

When controlling respective pretensioners of the safety belts 11, 12, the seat/safety belt driving unit C 4 increases/decreases a motor drive current if the pretensioner is equipped with a motor based on control information from the seat/safety belt controller C3, and changes the direction of the drive current, thereby controlling a retracting amount and a direction of each of the safety belts 11, 12. When the pretensioner utilizes gas pressure, the seat/safety belt driving unit C4 changes the gas pressure to change a moving direction and a moving amount of a ball, and a rotational direction of a gear and a rotational amount thereof, thereby controlling the retracting amount and the direction of each of the safety belts 11, 12.

When controlling respective expanding members of the right and left side supports 9dr, 9dl of the driver's seat 9 and respective expanding members of the right and left side supports 10dr, 10dl of the passenger seat 10, the seat/safety belt driving unit C4 controls, for each expanding member, air pressure of, for example, an air compressor and an accumulator, supplying/exhausting of air to each expanding member by opening/closing of a valve, and an amount of supplying air, thereby expanding/deflating each expanding member, based on control information from the seat/safety belt controller C3.

<<Flow of Seat/Safety Belt Control by Seat/Safety Belt ECU 7>>

Figure 9:
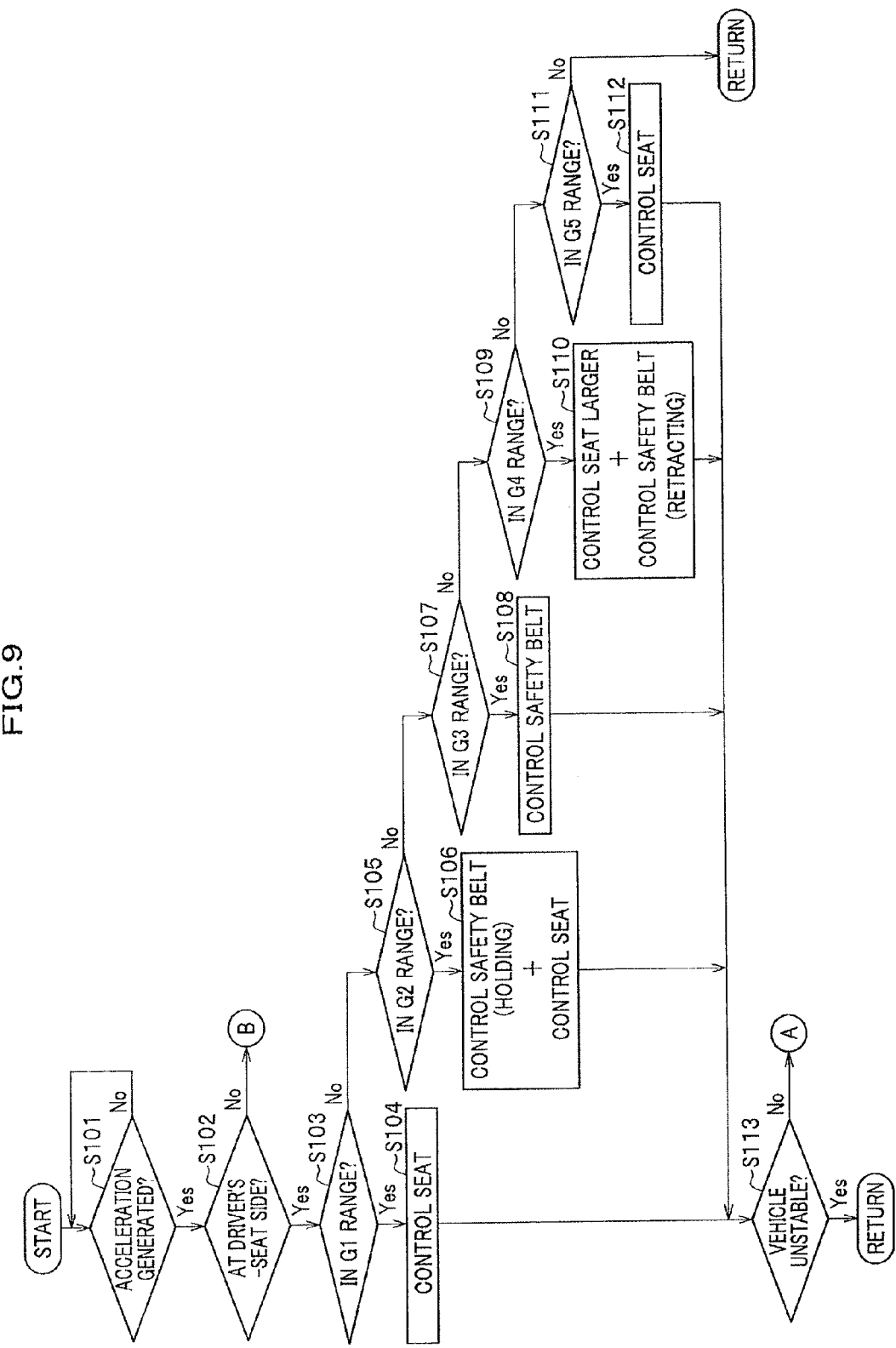
FIG. 9 is a flowchart showing a flow of a seat/safety belt control performed by a seat/safety belt ECU of the passive safety device.
Figure 10:
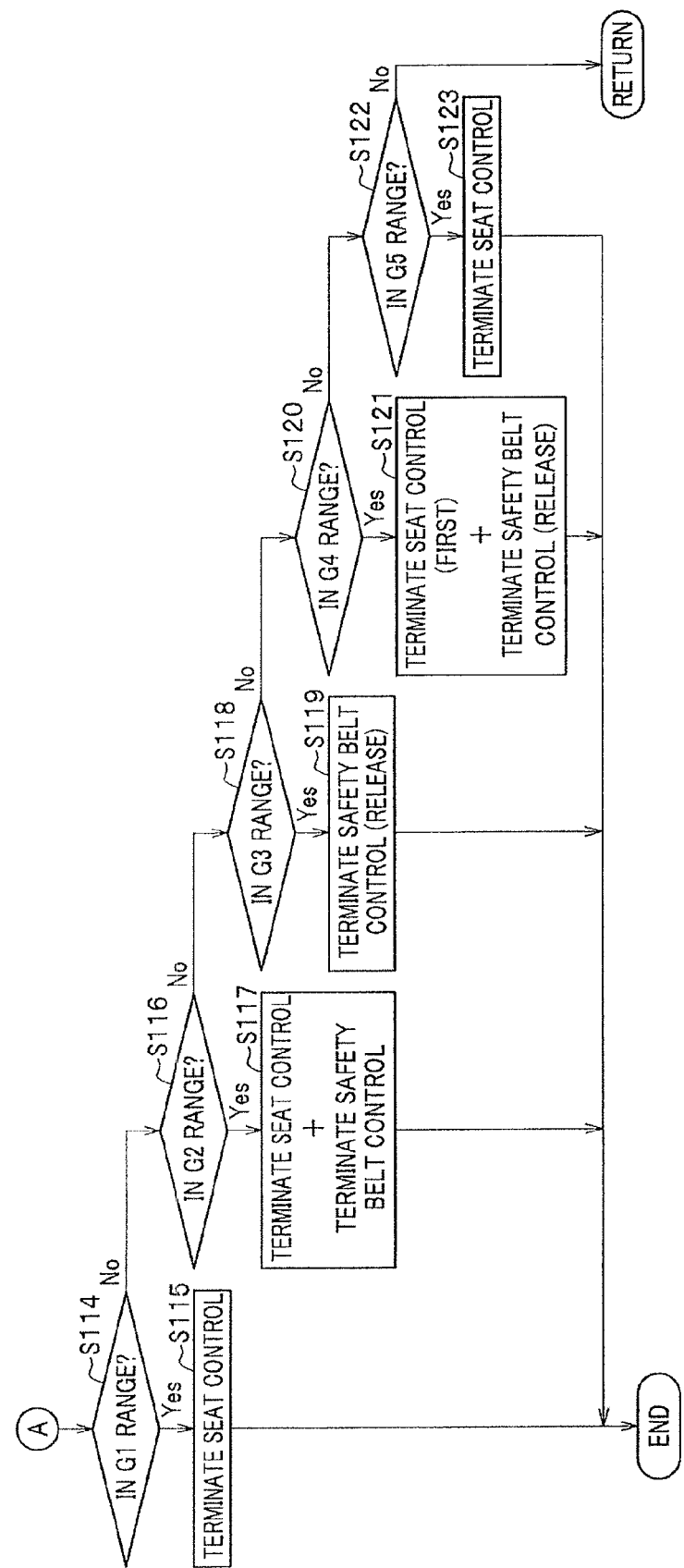
FIG. 10 is a flowchart showing a flow of a seat/safety belt control performed by a seat/safety belt ECU of the passive safety device.
Figure 11:
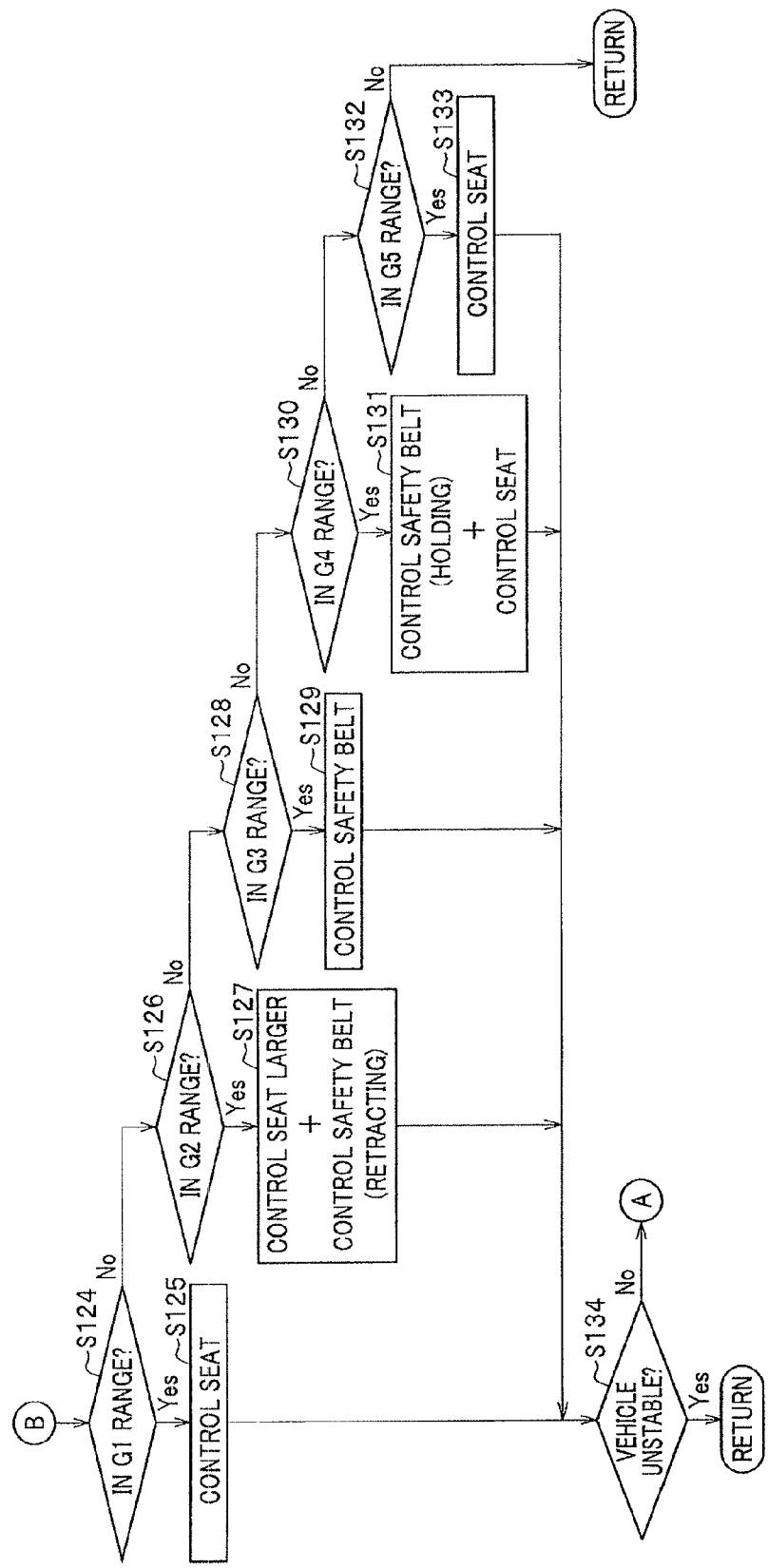
FIG. 11 is a flowchart showing a flow of a seat/safety belt control performed by a seat/safety belt ECU of the passive safety device.

Next, a flow of the seat/safety belt control by the seat/safety belt ECU 7 will be explained with reference to FIGS. 9 to 11. FIGS. 9, 10, and 11 are flowcharts showing a flow of the seat/safety belt control by the seat/safety belt ECU 7.

First, according to FIG. 9, the seat/safety belt control by the seat/safety belt ECU 7 is activated upon determination by the generated G calculating unit C2 whether or not an acceleration due to inertia which triggers this process and causes the driver p1 and the occupant p2 to move in the interior of the vehicle 100, e.g., the acceleration equal to or larger than 0.35 G that causes a person to start moving is generated (step S101). An occupant starts moving when the trigger acceleration is applied. However, by starting the process based on this trigger acceleration, a movement of the occupant can be prevented before starting the movement, or even if the occupant has already started moving, a further movement can be prevented.

The trigger acceleration for the step S101 may be smaller than 0.35 G in order to advance activation of the process, and depending on a vesicle 100, may be larger than 0.35 G.

For example, when a frequency that the trigger acceleration that causes the process to start at a certain time interval is high, a value of the trigger acceleration may be set to be a small value, and when a frequency that the trigger acceleration is applied is low, the value of the trigger acceleration may be set to be a large value. Alternatively, when the instability of the vehicle 100 is high, the value of the trigger acceleration may be set to be a small value, and when the instability of the vehicle 100 is low, the value of the trigger acceleration may be set to be a large value.

In consideration of a fact that the occupant is likely to start moving due to an acceleration in a direction in which the safety belt 11 or 12 is not put on the shoulder of the occupant like the driver p1 or the occupant p2, a vector of the acceleration is calculated and it is determined whether or not the leading end of the vector enters the deep-dots region shown in FIG. 8B. If the leading end of the vector enters such a region, a control depending on the direction may be activated.

In the flowchart, an explanation will be given of an example in which the trigger acceleration is fixed to a predetermined value (e.g., 0.35 G) different from a variable value as shown in FIG. 8B.

When an acceleration that causes the occupant to move is generated (step S101: Yes), the process progresses to a step S102, and the seat/safety belt controller C3 determines whether the acceleration is at the driver's-seat side or at the passenger-seat side. On the other hand, when it is determined in the step S101 that no acceleration that causes the occupant to move is generated (step S101: No), the process at the step S101 is continued.

When it is determined in the step S102 that the acceleration is at the driver's-seat side (step S102: Yes), the process progresses to a step S103. On the other hand, when it is determined in the step S102 that the acceleration is at the passenger-seat side, not at the driver's-seat side (step S102: No), the process transitions to a step S124 shown in FIG. 11. The process following the step S124 shown in FIG. 11 will be discussed later.

In the step S103 shown in FIG. 9, the seat/safety belt controller C3 determines whether or not the acceleration is in a G1 range (see FIGS. 5A and 8B). It is noted that whether or not the acceleration in the G1 range indicates a direction of the acceleration. The same is true for the following explanation.

When the acceleration is in the G1 range (step S103: Yes), the process progresses to a step S104, and the seat/safety belt driving unit C4 performs a holding control by the expanding members of the right and left side supports 9dr, 9dl of the driver's seat 9 (see two-dot chain lines in FIG. 3B).

On the other hand, when it is determined in the step S103 that the acceleration is not in the G1 range (step S103: No), the process progresses to a step S105, and the seat/safety belt controller C3 determines whether or not the acceleration is in a G2 range (see FIGS. 8A and 8B). When the acceleration is in the G2 range (step S105: Yes), the process progresses to a step S106, and the seat/safety belt driving unit C4 causes the safety belt 11 to hold the driver p1 by the pretensioner, as well as performs a holding control by the expanding members of the right and left side supports 9dr, 9dl of the driver's seat 9.

On the other hand, when it is determined in the step S105 that the acceleration is not in the G2 range (step S105: No), the process progresses to a step S107, and the seat/safety belt controller C3 determines whether or not the acceleration is in a G3 range (see FIGS. 8A and 8B). When the acceleration is in the G3 range (step S107: Yes), the process progresses to a step S108, and the seat/safety belt driving unit C4 performs a control to maintain the posture of the driver p1 by the safety belt 11, using the pretensioner.

On the other hand, when it is determined in the step S107 that the acceleration is not in the G3 range (step S107: No), the process progresses to a step S109, and the seat/safety belt controller C3 determines whether or not the acceleration is in a G4 range (see FIGS. 8A and 8B). When the acceleration is in the G4 range (step S109: Yes), the process progresses to a step S110, and the seat/safety belt driving unit C4 performs seat control on the right and left side supports 9dr, 9dl of the driver's seat 9, and in this seat control, expands the expanding member of the right side support 9dr larger than that of the left side support 9dl, or controls the expanding member of the right side support 9dr at an earlier stage than that of the left side support 9dl, e.g., at 0.25 G. At the same time, the seat/safety belt driving unit C4 controls the pretensioner to retract the safety belt 11.

On the other hand, when it is determined in the step S109 that the acceleration is not in the G4 range (step S109: No), the process progresses to a step S111, and the seat/safety belt controller C3 determines whether or not the acceleration is in a G5 range (see FIGS. 8A and 8B). When the acceleration is in the G5 range (step S111: Yes), the process progresses to a step S112, and the seat/safety belt driving unit C4 performs a seat control on the expanding members of the right and left side supports 9dr, 9dl of the driver's seat 9.

On the other hand, when it is determined in the step S111 that the acceleration is not in the G5 range (step S111: No), the process returns to the step S101.

After the foregoing steps, in a step S113, the vehicle condition determining unit C1 determines whether or not the condition of the vehicle 100 is stable as explained above. When the condition of the vehicle 100 is unstable (step S113: Yes), the process returns to the step S101.

On the other hand, when it is determined in the step S113 that the condition of the vehicle 100 is stable (step S113: No), the process progresses to a step S114 shown in FIG. 10.

In the step S114 shown in FIG. 10, the seat/safety belt controller C3 determines whether or not the acceleration is in the G1 range (see FIGS. 8A and 8B). When the acceleration is in the G1 range (step S114: Yes), the process progresses to a step S115, and the seat/safety belt driving unit C4 terminates the control of the expanding members of the right and left side supports 9dr, 9dl of the driver's seat 9.

On the other hand, when it is determined in the step S114 that the acceleration is not in the G1 range (step S114: No), the process progresses to a step S116, and the seat/safety belt controller C3 determines whether or not the acceleration is in the G2 range (see FIGS. 8A and 8B). When the acceleration is in the G2 range (step S116: Yes), the process progresses to a step S117, and the seat/safety belt driving unit C4 terminates the control for holding the safety belt 11 and the seat control by the right and left side supports 9dr, 9dl of the driver's seat 9.

On the other hand, when it is determined in the step S116 that the acceleration is not in the G2 range (step S116: No), the process progresses to a step S118, and the seat/safety belt controller C3 determines whether or not the acceleration is in the G3 range (see FIGS. 8A and 8B). When the acceleration is in the G3 range (step S118: Yes), the process progresses to a step S119, and the seat/safety belt driving unit C4 terminates the control of maintaining the posture of the driver p1 by the safety belt 11.

On the other hand, when it is determined in the step S118 that the acceleration is not in the G3 range (step S118: No), the process progresses to a step S120, and the seat/safety belt controller C3 determines whether or not the acceleration is in the G4 range (see FIGS. 8A and 8B). When the acceleration is in the G4 range (step S120: Yes), the process progresses to a step S121, and the seat control by the expanding members of the right and left side supports 9dr, 9dl of the driver's seat 9 is terminated earlier than the control for the safety belt 11, and then the control for the safety belt 11 is terminated.

On the other hand, when it is determined in the step S120 that the acceleration is not in the G4 range (step S120: No), the process progresses to a step S122, and the seat/safety belt controller C3 determines whether or not the acceleration is in the G5 range (see FIGS. 8A and 8B). When the acceleration is in the G5 range (step S122: Yes), the process progresses to a step S123, and the seat/safety belt driving unit C4 terminates the seat control for the right and left side supports 9dr, 9dl of the driver's seat 9.

On the other hand, when it is determined that the acceleration is not in the G5 range (step S122: No), the process returns to the step S101 shown in FIG. 9.

According to FIG. 9, in the step S102 in FIG. 9, when it is determined that the acceleration is at the passenger-seat side, not at the driver's-seat side (step S102: No), the process progresses to a step S124 shown in FIG. 11.

In the step S124 in FIG. 11, the seat/safety belt controller C3 determines whether or not the acceleration working on the occupant p2 sitting down the passenger seat 10 due to inertia to move the occupant p2 in the interior of the vehicle 100 is in a G1 range (see FIGS. 8B and 8C). When the acceleration is in the G1 range (step S124: Yes), the process progresses to a step S125, and the seat/safety belt driving unit C4 controls the expanding members of the right and left side supports 10dr, 10dl of the passenger seat 10.

On the other hand, when it is determined in the step S124 that the acceleration working on the occupant p2 is not in the G1 range (step S124: No), the process progresses to a step S126, and the seat/safety belt controller C3 determines whether or not the acceleration working on the occupant p2 sitting down the passenger seat 10 is in a G2 range (see FIGS. 8B and 8C). When the acceleration is in the G2 range (step S126: Yes), the process progresses to a step S127, and the seat/safety belt driving unit C4 performs a seat control for the right and left side supports 10dr, 10dl of the passenger seat 10, and in such a seat control, controls the expanding member of the right side support 10dr to become larger than that of the left side support 10dl, or controls the expanding member of the right side support 10dr at an earlier stage than that of the left side support 10dl, e.g., at 0.25 G, while performing a control to retract the safety belt 12 by the pretensioner at the same time.

On the other hand, when it is determined in the step S126 that the acceleration is not in the G2 range (step S126: No), the process progresses to a step S128, and the seat/safety belt controller C3 determines whether or not the acceleration working on the occupant p2 sitting down the passenger seat 10 is in a G3 range (see FIGS. 8B and 8C). When the acceleration is in the G3 range (step S128: Yes), the process progresses to a step S129, and the seat/safety belt driving unit C4 controls the safety belt 12 to maintain the posture of the occupant p2, using the pretensioner.

On the other hand, when it is determined in the step S128 that the acceleration working on the occupant p2 sitting down the passenger seat 10 is not in the G3 range (step S128: No), the process progresses to a step S130, and the seat/safety belt controller C3 determines whether or not the acceleration working on the occupant p2 sitting down the passenger seat 10 is in a G4 range (see FIGS. 8B and 8C). When the acceleration is in the G4 range (step S130: Yes), the process progresses to a step S131, and the seat/safety belt driving unit C4 causes the safety belt 12 to hold the occupant p2 by the pretensioner, as well as controls the expanding members of the right and left side supports 10dr, 10dl of the passenger seat 1C at the same time.

On the other hand, when it is determined in the step S130 that the acceleration working on the occupant p2 sitting down the passenger seat 10 is not in the G4 range (step S130: No), the process progresses to a step S132, and the seat/safety belt controller C3 determines whether or not the acceleration working on the occupant p2 sitting down the passenger seat 10 is in a G5 range (see FIGS. 8B and 8C). When the acceleration is in the G5 range (step S132: Yes), the process progresses to a step S133, and the seat/safety belt driving unit C4 performs a seat control by the expanding members of the right and left side supports 10dr, 10dl of the passenger seat 10.

On the other hand, when it is determined in the step S132 that the acceleration is not in the G5 range (step S132: No), the process returns to the step S101 in FIG. 9.

After the foregoing steps, in the step S134, the vehicle condition determining unit C1 determines whether the condition of the vehicle 100 is stable or unstable as explained above. When it is determined that the condition of the vehicle 100 is unstable (step S134: Yes), the process progresses to the step S101 in FIG. 9.

On the other hand, when it is determined in the step S134 that the condition of the vehicle 100 is stable (step S134: No), the process from the step S114 to the step S123 in FIG. 10 is executed for the passenger seat 10.

When the occupant p2 sitting down the passenger seat 10 is held by the safety belt 12, the left shoulder and the left chest of the occupant p2, which are opposite to the right shoulder and the right chest of the driver p1 sitting down the driver's seat 9 and held by the safety belt 11, are held, so that the step S117 and the step S121 in FIG. 10 are swapped.

That is, in the process where acceleration works on the passenger seat 10, when the determination in the step S116 in FIG. 10 is "Yes", the step S121 is executed. Likewise, when the determination in the step S120 in FIG. 10 is "Yes", the step S117 is executed. Other steps are same as those of the process when the acceleration is working on the driver's seat 9.

<Working and Effect>

According to the above-explained structure, when an acceleration is working on the own vehicle 100, an acceleration which causes an occupant (the driver p1 or the occupant p2) to move due to inertia is generated. Then, when it is forecasted that the occupant (the driver p1 or the occupant p2) will be moved, respective shapes of the driver's seat 9 and the passenger seat 10 and the safety belts 11, 12 are appropriately controlled. This makes it possible for the passive safety device to perform a control that prevents the occupant (the driver p1 or the occupant p2) from moving in accordance with an acceleration working on the vehicle 100.

Figure 12:
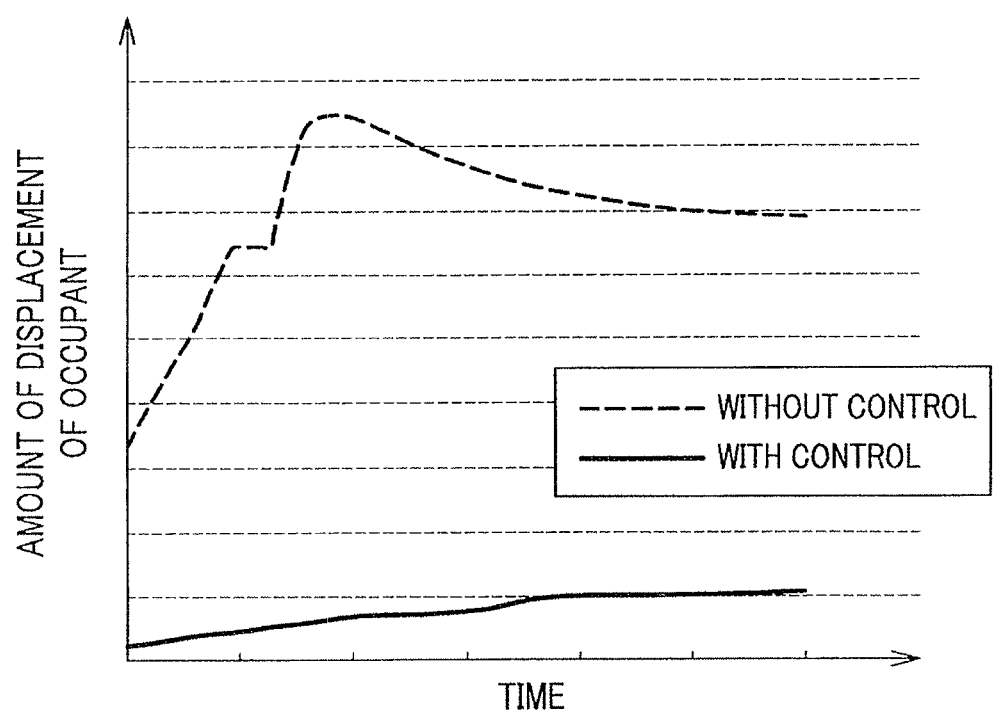
FIG. 12 is a diagram for comparing respective amounts of displacement of an occupant when controlled by the passive safety device and when not controlled.

FIG. 12 is a diagram for comparing respective displacements of the occupant (the driver p1 or the occupant p2) when controlled by the passive safety device and when not controlled. The horizontal axis represents a time and the vertical axis represents a displacement of the occupant (the driver p1 or the occupant p2).

For example, as shown in FIG. 12, when controlled by the passive safety device according to the embodiment, it is clear that the displacement of the occupant (the driver p1 or the occupant p2) is remarkably reduced in comparison with a case of absence of the control by the passive safety device.

Therefore, by appropriately holding the occupant (the driver p1 or the occupant p2) while the vehicle 100 is traveling, the displacement (amount of displacement) of the occupant in the interior of the vehicle 100 can be reduced, thereby making it possible for the driver p1 and the occupant p2 to drive comfortably.

In this embodiment, an example in which the present invention is applied to a front seat was explained, but it is obvious that the present invention can be applied to all seats and safety belts in the interior of the vehicle 100. In this case, the present invention is applied depending on the position of a safety belt worn by an occupant, i.e., whether or not it is right or left.

In addition, in this embodiment, the explanation was given of an example in which the vehicle 100 is a rear wheel drive type, but it is obvious that the present invention can be applied to the vehicle of other types than the rear wheel driving, such as front wheel driving, and four-wheel driving.

What is claimed is:

1. A passive safety device comprising:
    an acceleration detecting unit that detects an acceleration of a vehicle;
    a seat adjusting unit that expands a seat side of a seat in order to prevent an occupant sitting down the seat from moving, the seat adjusting unit including a left side support and a right side support that are adapted to be adjacent a left side and a right side, respectively, of the occupant sitting in the seat so that the left side support and the right side support face one another;
    a safety belt adjusting unit that controls tension of a safety belt worn by the occupant; and
    a control unit that controls an expansion of the seat side so as to decrease a distance between the left side support and the right side support and the tension of the safety belt through the seat adjusting unit and the safety belt adjusting unit, based on the detected acceleration of the vehicle, wherein when the direction of the acceleration working on the occupant due to inertia to move the occupant in the vehicle by the detected acceleration of the vehicle is a front-side direction opposite to a shoulder where the safety belt is put on, the seat adjusting unit largely expands the seat side larger in comparison with a direction other than the front-side direction.

2. The passive safety device according to claim 1, wherein the control unit determines whether or not to control either one of or both of the seat adjusting unit and the safety belt adjusting unit in accordance with a direction of an acceleration working on the occupant due to inertia to move the occupant in the vehicle, based on the detected acceleration of the vehicle.

3. The passive safety device according to claim 2, wherein the control unit determines whether or not to use each of the seat adjusting unit and the safety belt adjusting unit in accordance with a value of the acceleration working on the occupant due to inertia to move the occupant in the vehicle, based on the detected acceleration of the vehicle.

4. The passive safety device according to claim 1, wherein when the direction of the acceleration working on the occupant due to inertia to move the occupant in the vehicle by the detected acceleration of the vehicle is a rearward direction of the vehicle, the seat adjusting unit is actuated to expand the seat side.

5. The passive safety device according to claim 1, wherein when the direction of the acceleration working on the occupant due to inertia to move the occupant in the vehicle by the detected acceleration of the vehicle is the front-side direction; of the vehicle, the seat adjusting unit expands the seat side and the safety belt adjusting unit applies tension to the safety belt.

6. The passive safety device according to claim 1, wherein the control unit starts either one of or both of controlling of expansion of the seat side by the seat adjusting unit and controlling of tension of the safety belt by the safety belt adjusting unit when the acceleration working on the occupant due to inertia to move the occupant in the vehicle by the detected acceleration of the vehicle is not less than a predetermined value.

7. The passive safety device according to claim 1, wherein when the acceleration working on the occupant due to inertia to move the occupant in the vehicle by the acceleration detected by the acceleration detecting unit becomes not more than a predetermined value, the control unit terminates controls of the seat adjusting unit and/or the safety belt adjusting unit in operation.

8. The passive safety device according to claim 7, wherein when the direction of the acceleration working on the occupant due to inertia to move the occupant in the vehicle by the detected acceleration of the vehicle is the front-side direction; opposite to a shoulder where the safety belt is put on, the control unit first terminates a control of the seat adjusting unit, and then terminates a control of the safety belt adjusting unit.

9. The passive safety device according to claim 1, wherein the control unit that controls a deflation of the seat side so as to increase a distance between the left side support and the right side support based on the detected acceleration of the vehicle.

10. A passive safety device comprising:
    an acceleration detecting unit that detects an acceleration of a vehicle;
    a seat adjusting unit that expands a seat side of a seat in order to prevent an occupant sitting down the seat from moving;
    a safety belt adjusting unit that controls tension of a safety belt worn by the occupant; and
    a control unit that controls an expansion of the seat side and/or the tension of the safety belt through the seat adjusting unit and the safety belt adjusting unit, based on the detected acceleration of the vehicle, wherein when the direction of the acceleration working on the occupant due to inertia to move the occupant in the vehicle by the detected acceleration of the vehicle is a front-side direction opposite to a shoulder where the safety belt is put on, the seat adjusting unit largely expands the seat side larger in comparison with a direction other than the front-side direction.

11. A passive safety device comprising:
    an acceleration detecting unit that detects an acceleration of a vehicle;
    a seat adjusting unit that expands a seat side of a seat in order to prevent an occupant sitting down the seat from moving;
    a safety belt adjusting unit that controls tension of a safety belt worn by the occupant; and
    a control unit that controls an expansion of the seat side and/or the tension of the safety belt through the seat adjusting unit and the safety belt adjusting unit, based on the detected acceleration of the vehicle, wherein when the direction of the acceleration working on the occupant due to inertia to move the occupant in the vehicle by the detected acceleration of the vehicle is a front-side direction opposite to a shoulder where the safety belt is put on, the control unit first terminates a control of the seat adjusting unit, and then terminates a control of the safety belt adjusting unit.

* * * * *